(12) United States Patent
Bae et al.

(10) Patent No.: US 8,488,837 B2
(45) Date of Patent: Jul. 16, 2013

(54) APPARATUS AND METHOD FOR GENERATING CONSTRUCTIVELY MULTI-PATTERNED WATERMARK, AND APPARATUS AND METHOD FOR INSERTING AND DETECTING THE WATERMARK USING THE SAME

(75) Inventors: Ki-Hyeok Bae, Seoul (KR); Hyun-Tae Kim, Seoul (KR); In-Je Cho, Seoul (KR)

(73) Assignee: CK&B Co., Ltd., Seoul (KR)

( * ) Notice: Subject to any disclaimer, the term of this patent is extended or adjusted under 35 U.S.C. 154(b) by 354 days.

(21) Appl. No.: 13/055,649

(22) PCT Filed: Jul. 7, 2009

(86) PCT No.: PCT/KR2009/003690
§ 371 (c)(1),
(2), (4) Date: Jan. 24, 2011

(87) PCT Pub. No.: WO2010/011035
PCT Pub. Date: Jan. 28, 2010

(65) Prior Publication Data
US 2011/0123065 A1 May 26, 2011

(30) Foreign Application Priority Data
Jul. 24, 2008 (KR) ........................ 10-2008-0071986

(51) Int. Cl.
*G06K 9/00* (2006.01)
*G06K 9/36* (2006.01)
*G09C 3/08* (2006.01)
*G09C 3/00* (2006.01)
*H04N 7/167* (2011.01)
*H04N 1/40* (2006.01)
*H04K 1/00* (2006.01)
*H04L 9/38* (2006.01)

(52) U.S. Cl.
USPC ............ 382/100; 382/232; 358/3.28; 380/51; 380/54; 380/210; 380/287; 713/176

(58) Field of Classification Search
USPC 382/100, 232; 380/51, 54, 210, 287; 713/176
See application file for complete search history.

(56) References Cited

U.S. PATENT DOCUMENTS
2003/0194108 A1* 10/2003 Linnartz ........................ 382/100
2005/0169498 A1   8/2005 Choi et al.

FOREIGN PATENT DOCUMENTS
JP   2002-223348 A   8/2002
KR   10-2005-78767 A   8/2005

OTHER PUBLICATIONS
International Search Report for PCT/KR2009/003690.
English translation of Abstract of JP2002-223348.

\* cited by examiner

*Primary Examiner* — Amara Abdi
(74) *Attorney, Agent, or Firm* — The PL Law Group, PLLC

(57) ABSTRACT

An apparatus and a method for generating a constructively multi-patterned watermark, an apparatus and a method for inserting and detecting the watermark using the same. The method includes dividing user's hidden data into plural partial data and outputs the plural partial data, performing a message-encoding of the plural partial data, modulating the plural message-encoded data into image signal format and outputting plural message signals, generating a synchronization signal for synchronizing the constructively multi-patterned watermark with a two-dimensional translation of an image, generating, plural sub-base patterns using the plurality of message signals modulated into the image signal format, and the synchronization signal, and generating a base watermark that is the constructively multi-patterned watermark, using the plural sub-base patterns. Therefore, the invention increases the payload of the watermark, withstands robustly the two-dimensional translation of an image and general geometric transform of the image through the constructive characteristics of the watermark.

19 Claims, 9 Drawing Sheets

APPARATUS AND METHOD FOR GENERATING CONSTRUCTIVELY MULTI-PATTERNED WATERMARK, AND APPARATUS AND METHOD FOR INSERTING AND DETECTING THE WATERMARK USING THE SAME

CROSS REFERENCE TO RELATED APPLICATION AND CLAIM OF PRIORITY

The present application claims all benefits accruing under 35 U.S.C. §365(c) from the PCT International Application PCT/KR2009/003690, with an International Filing Date of Jul. 7, 2009, which claims the benefit of Korean patent application No. 10-2008-0071986 filed in the Korean Intellectual Property Office on Jul. 24, 2008, the entire contents of which are incorporated herein by reference.

BACKGROUND

1. Field of the Invention

The present invention relates to a digital image processing and, more particularly, to an apparatus and a method for generating a constructively multi-patterned watermark, an apparatus and a method for inserting and detecting the watermark using the same.

2. Description of the Related Art

Digital watermarking is a technique for inserting particular information in the form of signals unrecognizable by sight or hearing, into multimedia contents such as texts, videos, static images, etc. to conceal them, and extracting the concealed information to use them as additional information for authentication of copyrights and images and for monitoring of videos.

These digital watermarking techniques include trade-off characteristics as follows.
1. Invisibility: An original image and a watermarked image should be undistinguishable by human sight.
2. Robustness: a watermark should be detectable in spite of transforms of multimedia contents such as various image processing, noises, image compression, geometric transforms, digital to analog conversion, etc.
3. Payload: As much information as possible should be able to be inserted into the same multimedia contents.

The invisibility or payload should be lowered in order to elevate the watermark robustness, while the robustness or invisibility should be lowered in order to elevate the payload.

Therefore, the digital watermarking techniques for elevating the watermark payload and watermark robustness simultaneously are being demanded.

On the other hand, various methods for withstanding geometric transforms of an image in terms of the watermark robustness has been provided, which can withstand limited transforms such as mainly rotation, image scaling, cropping or shift, etc.

However, actually novel methods for withstanding general geometric transforms as well as the limited transforms are being demanded.

SUMMARY

An object of the present invention is to provide an apparatus and a method for generating a constructively multi-patterned watermark, and an apparatus and a method for inserting and detecting the watermark using the same, which can not only increase watermark payloads but can also enhance watermark robustness.

Another object of the present invention is to provide an apparatus and a method for generating a constructively multi-patterned watermark, and an apparatus and a method for inserting and detecting the watermark using the same, which can withstand general geometric transforms of an image as well as a two-dimensional translation of the image.

Still another object of the present invention is to provide an apparatus and a method for generating a constructively multi-patterned watermark, an apparatus and a method for inserting and detecting the watermark using the same, which can enhance a watermark detection rate.

In an example to solve the above-mentioned problems, an apparatus that generates a constructively multi-patterned watermark includes a data divider that divides user's hidden data into a plurality of partial data and outputs the plurality of partial data, an encoder that performs a message-encoding of the plurality of partial data, a modulator that modulates the plurality of message-encoded partial data into image signal format and outputs a plurality of message signals, a synchronization signal generator that generates a synchronization signal for synchronizing the constructively multi-patterned watermark with a two-dimensional translation of an image, a sub-base pattern generator that generates a plurality of sub-base patterns using the plurality of message signals modulated into the image signal format, and the synchronization signal; and a base watermark generator that generates a base watermark that is the constructively multi-patterned watermark, using the plurality of sub-base patterns.

The encoder performs the message-encoding of the plurality of partial data using an error correction code.

The data divider divides the user's hidden data into an N×N number of partial data (N: natural number), preferably 4 number of partial data and outputs the 4 number of partial data. The base watermark generator inserts each of 4 sub-base patterns into each corresponding area, in the form of a non-rotated, a 90 degree-rotated, a 180 degree-rotated, and a 270 degree-rotated pattern, respectively so as to generate the base watermark. Further, the base watermark generator inserts each of 4 sub-base patterns into each corresponding area in the form of an original pattern, a vertically symmetrical pattern, a horizontally symmetrical pattern, and a vertically and horizontally symmetrical pattern, respectively so as to generate the base watermark.

In an example, a method for generating a constructively multi-patterned watermark includes dividing, by a data divider, user's hidden data into a plurality of partial data and outputs the plurality of partial data, performing, by an encoder, a message-encoding of the plurality of partial data, modulating, by a modulator, the plurality of message-encoded data into image signal format and outputting a plurality of message signals, generating, by a synchronization signal generator, a synchronization signal for synchronizing the constructively multi-patterned watermark with corresponding to a two-dimensional translation of an image, generating, by a sub-base pattern generator, a plurality of sub-base patterns using the plurality of message signals modulated into the image signal format, and the synchronization signal, and generating, by a base watermark generator, a base watermark that is the constructively multi-patterned watermark, using the plurality of sub-base patterns.

In an example, an apparatus that inserts a constructively multi-patterned watermark includes a raw data extractor that extracts raw data from an original image that is inputted, a YUV space converter that converts color space of the extracted raw data into YUV color space and extracts a Y component from the YUV color space, a constructively multi-patterned watermark generator that generates a plurality of sub-base patterns dividing user's hidden data into a plurality of partial data and generates, with the plurality of sub-base patterns, the constructively multi-patterned watermark that is a base watermark, and a watermark inserter that determines a watermark insertion strength for insertion of the constructively multi-patterned watermark into the extracted Y component and inserts the constructively multi-patterned watermark into the Y component applying the determined watermark insertion strength.

The constructively multi-patterned watermark generator includes a data divider that divides user's hidden data into a plurality of partial data and outputs the plurality of partial data, an encoder that performs a message-encoding of the plurality of partial data, a modulator that modulates the plurality of message-encoded partial data into image signal format, and outputs a plurality of message signals, a synchronization signal generator that generates a synchronization signal for synchronizing the constructively multi-patterned watermark with a two-dimensional translation of an image, a sub-base pattern generator that generates a plurality of sub-base patterns using the plurality of message signals modulated into the image signal format, and the synchronization signal, and a base watermark generator that generates a base watermark that is the constructively multi-patterned watermark, using the plurality of sub-base patterns.

The watermark inserter inserts the constructively multi-patterned watermark into the Y component using the following formula:

$$I'_{n,m}=I_{n,m}+\alpha_r \cdot ((1-\text{MWMS}_{n,m})S_0+\text{MWMS}_{n,m}S_1)\cdot w_{n,m}$$

where $I'_{n,m}$ is watermarked contents, $I_{n,m}$ is original contents, $w_{n,m}$ is a watermark, $\alpha_r$ is a local watermark insertion strength, and $S_0$, $S_1$ are fixed coefficients.

In an example, a method for inserting a constructively multi-patterned watermark includes extracting, by a data extractor, raw data from an original image that is inputted, converting, by a YUV space converter, color space of the extracted raw data into YUV color space and extracting a Y component from the YUV color space, dividing, by a constructively multi-patterned watermark generator, user's hidden data into a plurality of data to generate a plurality of sub-base patterns and generating, with the plurality of sub-base patterns, the constructively multi-patterned watermark that is a base watermark, and determining, by a watermark inserter, a watermark insertion strength for insertion of the constructively multi-patterned watermark into the extracted Y component and inserting the constructively multi-patterned watermark into the Y component applying the determined watermark insertion strength.

Generating the constructively multi-patterned watermark includes dividing, by a data divider, user's hidden data into a plurality of partial data and outputs the plurality of partial data, performing, by an encoder, a message-encoding of the plurality of partial data, modulating, by a modulator, the plurality of message-encoded data into image signal format and outputting a plurality of message signals, generating, by a synchronization signal generator, a synchronization signal for synchronizing the constructively multi-patterned watermark with corresponding to a two-dimensional translation of an image, generating, by a sub-base pattern generator, a plurality of sub-base patterns using the plurality of message signals modulated into the image signal format, and the synchronization signal, and generating, by a base watermark generator, a base watermark that is the constructively multi-patterned watermark, using the plurality of sub-base patterns.

Determining the watermark insertion strength, and inserting the constructively multi-patterned watermark into the Y component applying the determined watermark insertion strength includes performing a modeling for the extracted Y component using a probabilistic modeling, calculating a MWMS (Maximum Watermark Strength) using a ML (Maximum Likelihood) estimation or a MAP (Maximum A Posteriori) estimation for the modeling, dividing image of the extracted Y component into partial images with a size of m×m pixels, and calculating each local watermark insertion strength of the partial images according to a corresponding ratio of flat areas, edge areas and complex areas of each of the partial images, and inserting the constructively multi-patterned watermark into the Y component using the MWMS and the local watermark insertion strength.

Inserting the constructively multi-patterned watermark into the Y component comprises using the following formula:

$$I'_{n,m}=I_{n,m}+\alpha_r \cdot ((1-\text{MWMS}_{n,m})S_0+\text{MWMS}_{n,m}S_1)\cdot w_{n,m}$$

where $I'_{n,m}$ is watermarked contents, $I_{n,m}$ is original contents, $w_{n,m}$ is a watermark, $\alpha_r$ is a local watermark insertion strength, and $S_0$, $S_1$ are fixed coefficients.

In an example, an apparatus that detects a constructively multi-patterned watermark includes a raw data extractor that extracts raw data from an image with the constructively multi-patterned watermark inserted, a YUV space converter that converts color space of the extracted raw data into YUV color space and extracts a Y component from the YUV color space, a watermark detector that predicts a watermark detection strength from the extracted Y component and detects the constructively multi-patterned watermark from the Y component applying the watermark detection strength, a two-dimensional translation restorer that performs synchronization with respect to a two-dimensional translation of the image to restore the two-dimensional translation of the image, a message code extractor that extracts a message code from a watermark signal where the two-dimensional translation is restored, and a user's hidden data extractor that extracts user's hidden data from the extracted message code.

The apparatus that detects a constructively multi-patterned watermark further includes a geometric transform predictor that predicts a degree of geometric transform of the image, and a geometric transform restorer that restores the geometric transform of the image using the predicted degree of the geometric transform.

The geometric transform predictor measures auto correlation pattern of the detected constructively multi-patterned watermark, and extracts coordinates of pixels whose auto correlation values have a periodic pattern (i.e., are periodically high), in order to predict the degree of the geometric transform of the image.

The geometric transform restorer calculates an inverse transform parameter for the geometric transform of the image using the coordinates of pixels whose auto correlation values are periodically high, and restores the geometric transform of the image using the inverse transform parameter.

The geometric transform restorer selects a group of 4 coordinates with a first highest peak value to a fourth highest peak value, respectively, among the coordinates whose auto correlation values are periodically high, and then abandons restoring the geometric transform of the image if the 4 coordinates meet any one of the following conditions: (1) each straight-line distance between any two of the 4 coordinates is less than ½ of each straight-line distance between any two of the 4 coordinates on an original image, (2) each of internal angles that are formed by connecting three coordinates is outside of the range from 75 to 105 degrees, and (3) a ratio of the lengths of two straight lines that are formed by connecting three coordinates is more than 1:2.

In an example, a method for detecting a constructively multi-patterned watermark includes extracting, by a raw data extractor, raw data from an image with the constructively multi-patterned watermark inserted, converting, by a YUV space converter, color space of the extracted raw data into YUV color space and extracting a Y component from the YUV color space, predicting, by a watermark detector, a watermark detection strength from the extracted Y component and detecting the constructively multi-patterned watermark from the Y component applying the watermark detection strength, performing, by a two-dimensional translation restorer, synchronization with respect to a two-dimensional translation of the image to restore the two-dimensional translation of the image, extracting by a message code extractor, a message code from a watermark signal whose two-dimensional translation is restored, and extracting, by a user's hidden data extractor, user's hidden data from the extracted message code.

The method for detecting a constructively multi-patterned watermark further includes, if the message is not extracted by the message code extractor, predicting, by a geometric transform predictor, a degree of geometric transform of the image, and restoring, by a geometric transform restorer, the geometric transform of the image using the predicted degree of the geometric transform.

Predicting the degree of the geometric transform of the image comprises includes measuring auto correlation pattern of the detected constructively multi-patterned watermark, and extracting coordinate of pixels whose measured auto correlation values are periodically high.

Restoring the geometric transform of the image includes calculating an inverse transform parameter for the geometric transform of the image using the coordinates of pixels whose auto correlation values are periodically high, and restoring the geometric transform of the image using the inverse transform parameter.

According to an example of the present invention, it can divide user's hidden data into a plurality of partial data to generate a constructively multi-patterned watermark, and thereby can increase watermark payloads so as to insert a wide variety of information.

Further, the present invention can make it possible to withstand robustly general geometric transform of an image as well as a two-dimensional translation of the image through constructive features of the constructively multi-patterned watermark.

Furthermore, the present invention can make it possible to detect the watermark at a high rate through constructive features of the constructively multi-patterned watermark in spite of a variety of image transform or image compilation.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION

Hereinafter, embodiments of an apparatus and a method for generating a constructively multi-patterned watermark, an apparatus and a method for inserting a watermark using the same, an apparatus and a method for detecting a watermark in the present invention will be described with reference to FIGS. 1 to 9. The following drawings and description are associated with embodiments from among various embodiments for effective explanation of the present invention, and the present invention is not limited by them.

In the following description of the present invention, a detailed description of known functions and configuration incorporated herein will be omitted when it may make the subject matter of the present invention rather unclear. Terms which will be described in the specification are defined on the basis of the entire contents of the present specification.

Figure 1:
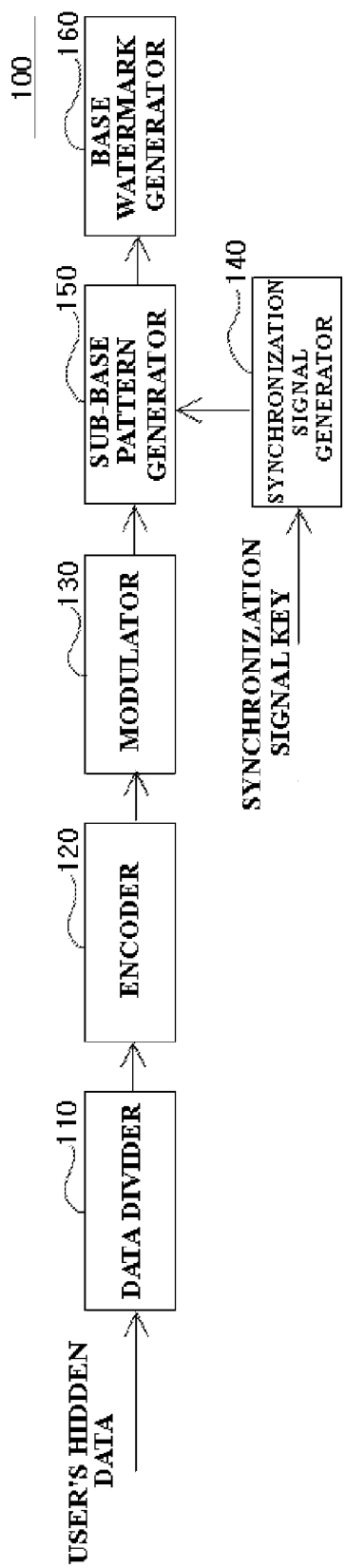
FIG. 1 is a block diagram illustrating an apparatus for generating a constructively multi-patterned watermark of the present invention.

FIG. 1 is a block diagram illustrating an apparatus for generating a constructively multi-patterned watermark according to an embodiment of the present invention.

Referring to FIG. 1, an apparatus 100 for generating a constructively multi-patterned watermark includes a data divider 110, an encoder 120, a modulator 130, a synchronization signal generator 140, a sub-base pattern generator 150, and a base watermark generator 160.

The data divider 110 divides user's hidden data that is inputted, into a particular number of data and outputs the particular number of data. The user's hidden data includes contents copyright information regarding contents owner information (for example, a name, an e-mail address, a contact number, etc.), a unique number, a production date, etc.

In other words, the data divider 110 divides the user's hidden data that is inputted, into an N×N number of data (N: natural number), preferably, 4 number of data and outputs them.

For example, if the user's hidden data is data with a size of 28 bits, the data divider 110 divides the user's hidden data into 4 partial data with a size of 7 bits and outputs them. The data divider 110 may output the divided partial data simultaneously or successively at some time intervals.

The encoder 120 performs a message-encoding of the partial data divided by the data divider 110, using an error correction code. The error correction code may include a RS (Reed-Solomon) code or LDPC (Low Density Parity Check) code, etc.

The reason why the encoder 120 performs the message-encoding using the error correction code is to make it possible to restore an original data though the divided partial data are distorted or transformed.

If the data divider 110 may output the divided partial data simultaneously, the encoder 120 can be configured with a plurality of encoders arranged in parallel in order to output the partial data simultaneously.

On the other hand, if the data divider 110 may output the divided partial data successively, the encoder 120 can be configured with one encoder in order to output the partial data successively.

The modulator 130 modulates a plurality of message-encoded partial data into image signal format and outputs a plurality of message signals. The modulator 130 may modulate the plurality of message-encoded partial data into image signal format by a M-ary modulation or a Binary modulation method using spread spectrum.

In general, user's hidden data with a variety of formats such as a character string, e.g. "www.cknb.co.kr", or a bit string, e.g. "10101100", etc. is inserted into a watermark. In this case, on detecting the watermark, the error probability of the entire code word with respect to the watermark is quite more meaningful and important than the error probability of the overall bit with respect to the watermark.

By way of example, a watermark with a size of a total of 1024 bits is generated using a www.cknb.co.kr. If 100 bits in the fore part of the watermark is mistakenly detected in succession, the letter "ww" became broken and thereby the watermark cannot be detected. If 100 bits in the watermark is mistakenly detected at random, the watermark can be detected since one code word is not broken entirely. Thus, whether the watermark can be detected is determined not by an overall bit error with respect to the watermark but by a code word error.

Therefore, in order to enhance watermark robustness on detecting a watermark, an embodiment of the present invention reduces error probability by the symbol using a M-ary modulation or a Binary modulation method through spread spectrum.

On the one hand, if the encoder 120 can be configured with a plurality of encoders arranged in parallel, the modulator 130 may also be configured with a plurality of modulators arranged in parallel. The plurality of modulators modulates the message-encoded partial data into image signal format simultaneously.

On the other hand, if the encoder 120 can be configured with one encoder, the modulator 130 may also be configured with one modulator. The modulator 130 modulates the message-encoded partial data into image signal format successively.

The synchronization signal generator 140 generates a synchronization signal for synchronizing the watermark with a two-dimensional translation of an image, for example cropping, shift, etc.

The synchronization signal generator 140 generates the synchronization signal using a synchronization signal key which functions as a seed value, i.e., an initial value at the time of generating the synchronization signal.

The sub-base pattern generator 150 generates a plurality of sub-base patterns using a plurality of message signals modulated into the image signal format and the synchronization signal.

By way of example, if the data divider 110 divides user's hidden data into 4 partial data, the modulator 130 outputs a total of 4 message signals and the sub-base pattern generator 150 generates a total of 4 sub-base patterns using the 4 modulated message signals and the synchronization signal.

In other words, the sub-base pattern generator 150 combines one synchronization signal with each of the 4 message signals which includes different data, and generates 4 sub-base patterns that forms a base watermark. Each of the sub-base patterns has a size of N×N pixels.

In one example, if the modulator 130 is configured with a plurality of modulators which are connected in parallel, the sub-base pattern generator 150 may also be configured with a plurality of sub-base pattern generators connected in parallel. In this case, each of the plurality of sub-base pattern generators generates the sub-base patterns simultaneously using each message signal and a synchronization signal.

In another example, if the modulator 130 is configured with one modulator, the sub-base pattern generator 150 may also be configured with one sub-base pattern generator. In this case, the sub-base pattern generator 150 generates a plurality of sub-base patterns successively using a plurality of message signals and a synchronization signal.

The base watermark generator 160 generates a base watermark using the plurality of sub-base patterns.

By way of example, if the data divider 110 divide user's hidden data into 4 partial data, the sub-base pattern generator 150 generates 4 sub-base patterns and the base watermark generator 160 generates a base watermark using the 4 sub-base patterns. In this case, if each of the sub-base patterns has a size of N×N pixels, the base watermark has a size of 2N×2N pixels.

There is provided two methods that generate a base watermark using the 4 sub-base patterns as follows.

Figure 2:
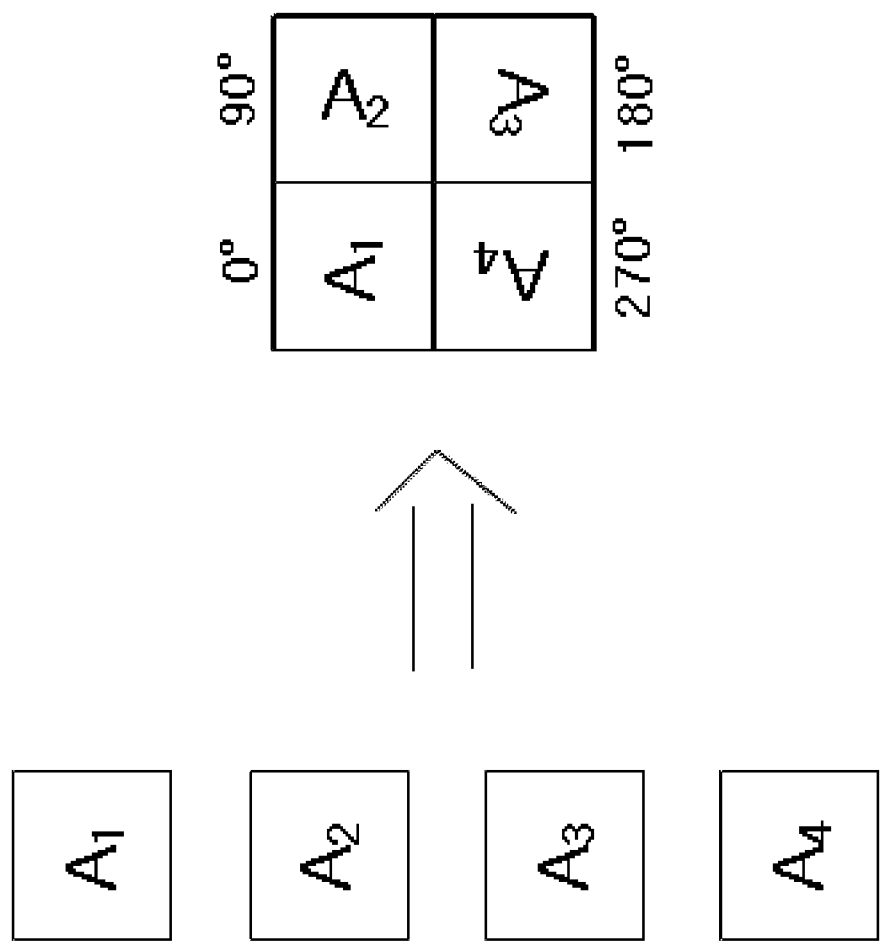
FIG. 2 illustrates a first example that generates a base watermark using 4 sub-base patterns.

FIG. 2 illustrates a first example that generates a base watermark using 4 sub-base patterns.

Referring to FIG. 2, a base watermark is formed by 4 sub-base patterns A1, A2, A3, and A4. In this case, each of a first sub-base pattern A1 to a fourth sub-base pattern A4 is rotated by 0 degree, 90 degrees, 180 degrees, and 270 degrees, respectively, in order to be inserted.

Figure 3:
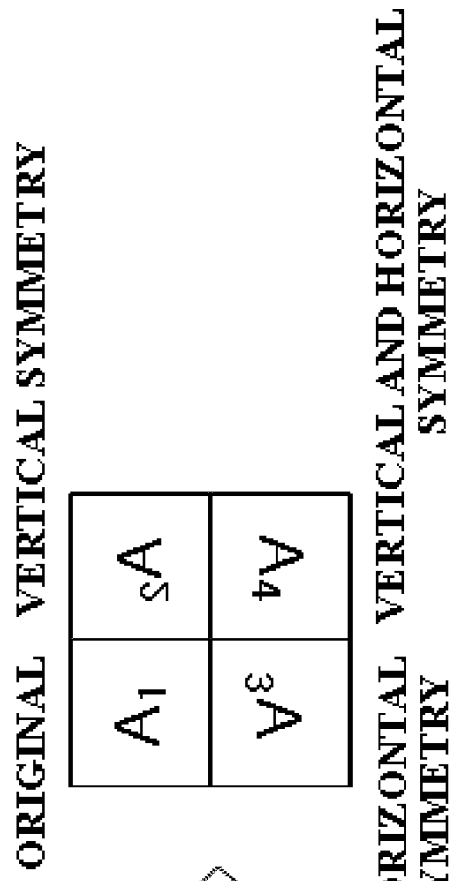
FIG. 3 illustrates a second example that generates a base watermark using 4 sub-base patterns.
Figure 3:
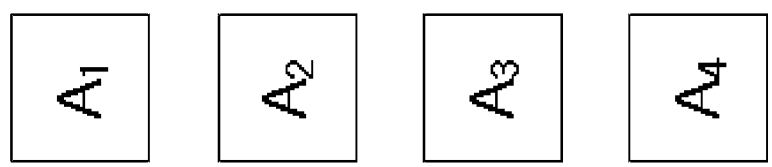

FIG. 3 illustrates a second example that generates a base watermark using 4 sub-base patterns.

Referring to FIG. 3, a base watermark is formed by 4 sub-base patterns A1, A2, A3, and A4. In this case, each of a first sub-base pattern A1 to a fourth sub-base pattern A4 is inserted in the form of an original pattern, a vertically symmetrical pattern, a horizontally symmetrical pattern, and a vertically and horizontally symmetrical pattern.

The reason for inserting the first sub-base pattern A1 to a fourth sub-base pattern A4 in a the form of a non-rotated, a 90 degree-rotated, a 180 degree-rotated, and a 270 degree-rotated pattern, respectively, or in the form of an original pattern, a vertically symmetrical pattern, a horizontally symmetrical pattern, and an vertically and horizontally symmetrical pattern in order to form the base watermark is for maintaining a watermark robustness and enhancing a detection rate on detecting the watermark.

In accordance with an embodiment of the present invention, the user's hidden data is divided into a plurality of partial data to form a plurality of sub-base patterns and the plurality of sub-base patterns form a base watermark. In this case, the formed base watermark is defined as a constructively multi-patterned watermark.

The constructively multi-patterned watermark of the present invention can increase payloads of user's hidden data compared to a conventional base watermark with the same size by a conventional method.

For example, a constructively multi-patterned watermark with a size of 2N×2N pixels according to the embodiments of the present invention can increase a maximum of 4 times payloads using 4 sub-base patterns with a size of N×N pixels, compared to a conventional base watermark with a size of 2N×2N pixels by a conventional method.

In addition, according to the constructively multi-patterned watermark of the embodiment of the present invention, since each of 4 sub-base patterns is inserted in the form of a non-rotated, 90 degree-rotated, a 180 degree-rotated, and 270 degree-rotated pattern, respectively, or in the form of an original pattern, a vertically symmetrical pattern, a horizontally symmetrical pattern, and an vertically and horizontally symmetrical pattern, respectively in order to form one base watermark, the constructive features of the base watermark make it possible to robustly withstand a variety of compilation and geometric transform of multimedia contents and to accelerate a detection rate on detecting the watermark.

Figure 4:
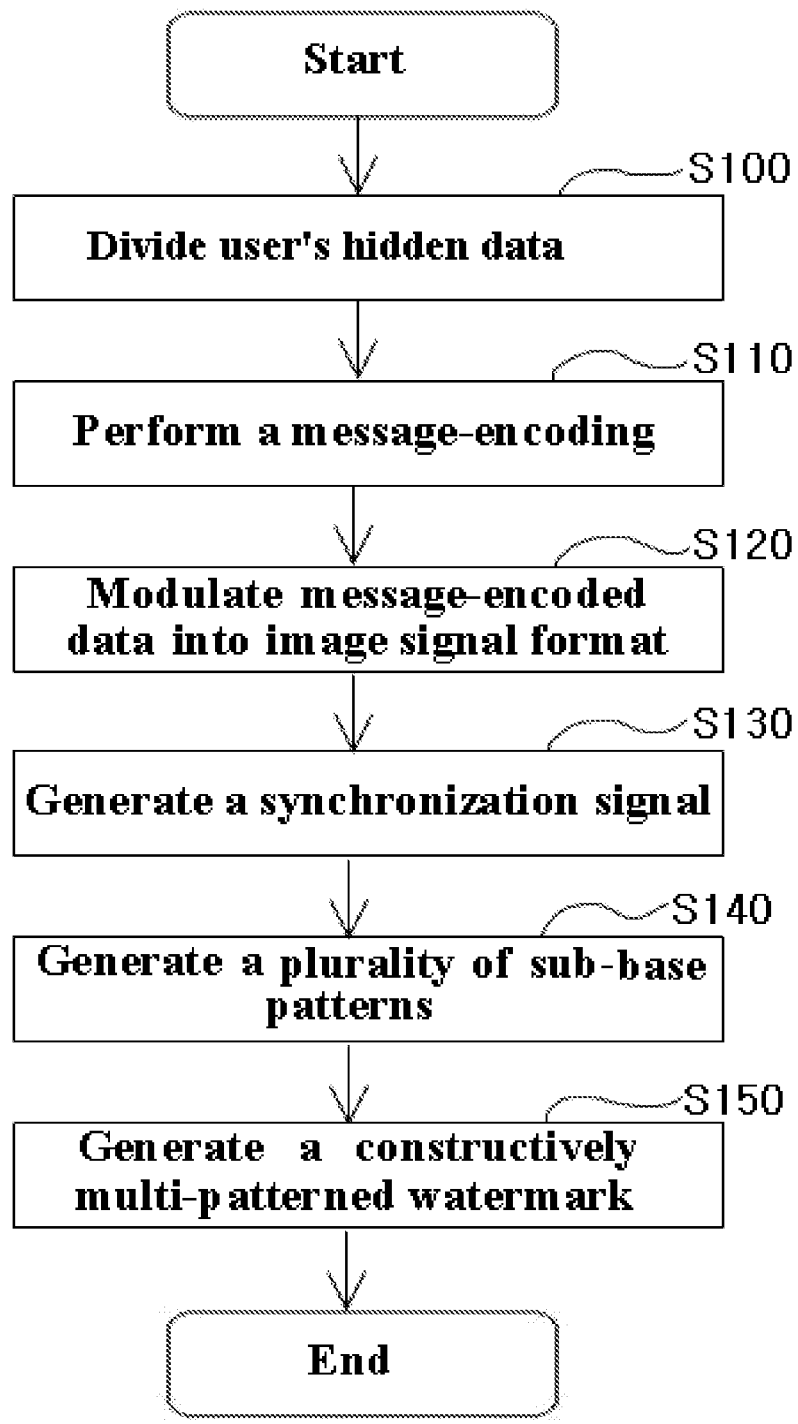
FIG. 4 is a flow diagram illustrating a method for generating a constructively multi-patterned watermark of the present invention.

FIG. 4 is a flow diagram illustrating a method for generating a constructively multi-patterned watermark according to an embodiment of the present invention.

Referring to FIG. 4, at block S100, a data divider 110 divides user's hidden data, which is inputted, into a particular number of partial data. The data divider 110 divides the user's hidden data into an N×N (N: natural number) number of partial data, preferably 4 partial data.

At block S110, an encoder 120 performs a message-encoding of the plurality of partial data using an error correction code.

The error correction code may include a RS (Reed-Solomon) code or a LDPC (Low Density Parity Check) code, etc.

At block 120, a modulator 130 modulates the plurality of message-encoded partial data into image signal format, and outputs a plurality of message signals.

The modulator 130 modulates a plurality of message-encoded partial data into image signal format by a M-ary modulation or a Binary modulation method using spread spectrum.

At block 130, a synchronization signal generator 140 generates a synchronization signal for synchronizing the watermark with a two-dimensional translation (for example, Cropping, Shifting) of an image.

The synchronization generator 140 generates a synchronization signal using a synchronization signal key that functions as a seed value.

At block 140, a sub-base pattern generator 150 generates a plurality of sub-base patterns using the plurality of message signals modulated into the image signal format, and the synchronization signal.

In other words, the sub-base pattern generator 150 combines one synchronization signal with each of the plurality of message signals that includes different information, and generates a plurality of sub-base patterns that forms a base watermark.

At block 150, a base watermark generator 160 generates a base watermark that is a constructively multi-patterned watermark, using the plurality of sub-base patterns.

Each of the plurality of sub-base patterns is inserted in the form of a 0 degree-rotated, a 90 degree-rotated, a 180 degree-rotated, and a 270 degree-rotated pattern, respectively, or in the form of an original pattern, a vertically symmetrical pattern, a horizontally symmetrical pattern, and a vertically and horizontally symmetrical pattern, respectively, so as to form the constructively multi-patterned watermark.

Figure 5:
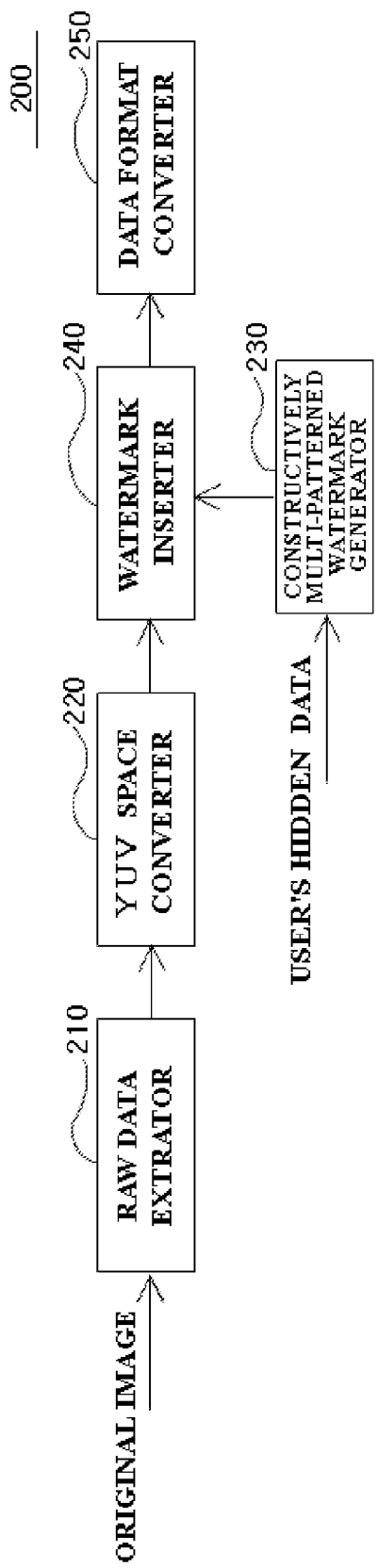
FIG. 5 is a block diagram illustrating an apparatus for inserting a watermark using the constructively multi-patterned watermark of the present invention.

FIG. 5 is a block diagram illustrating an apparatus for inserting a watermark using the constructively multi-patterned watermark of the embodiment of the present invention.

Referring to FIG. 5, an apparatus 200 that inserts a constructively multi-patterned watermark according to the embodiment of the present invention includes a raw data extractor 210, a YUV space converter 220, a constructively multi-patterned watermark generator 230, a watermark inserter 240, and a data format converter 250.

The raw data extractor 210 extracts raw data from an original image that is inputted. The reason for extracting the raw data from the original image is that a watermark is intended to be inserted in a non-compressed area since multi-media contents are generally encoded into a specific format.

The YUV space converter 220 converts color space of the extracted raw data into YUV color space, and extracts a Y component (Luminance component) from the YUV color space.

Multi-media contents are typically expressed by various color spaces such as RGB, YIQ, YUV, YCrCb, HSV, etc. Thus, in order to use a luminance component which all images have in common, the YUV space converter 220 converts color space of the extracted raw data into YUV color space, and extracts the Y component from the converted YUV color space.

In addition, since an eye of a human is quite less sensitive to a change in luminance than a change in chrominance, it is preferable to use the luminance component as a watermark. Another advantage of using the luminance component is that the luminance component is not changed by image conversion compared to the chrominance component.

The constructively multi-patterned watermark generator 230 generates a plurality of sub-base patterns dividing user's hidden data into a plurality of partial data, and generates, with the plurality of sub-base patterns, a constructively multi-patterned watermark that is a base watermark. The detailed description for this is equal to the forgoing mentioned.

The watermark inserter 240 determines an adaptive watermark insertion strength for insertion of the constructively multi-patterned watermark into an original image, and inserts the constructively multi-patterned watermark into the extracted Y component applying the adaptive watermark insertion strength.

The watermark inserter 240 performs a modeling for the Y component of the original image and then calculates a MWMS (Maximum Watermark Strength) using a ML (Maximum Likelihood) estimation or a MAP (Maximum A Posteriori) estimation method, in order to insert the watermark in an image pixel spatial domain.

The MWMS is normalized into a value from 0 to 1 according to image complexity. As the MWMS is closer to 0, the image is considered to be a complex area where noise is not almost viewed. As the MWMS is closer to 1, the image is considered to be a flat area where a bit of noise makes it easier to feel the change in the image.

Formula 1 shows a formula for the insertion of the watermark using the MWMS.

$$I'_{n,m} = I_{n,m} + \alpha \cdot (1 - MWMS_{n,m}) \cdot w_{n,m} \quad \text{[Formula 1]}$$

where, $I'_{n,m}$ is watermarked contents, $I_{n,m}$ is original contents, $w_{n,m}$ is a watermark, $\alpha$ is a global watermark insertion strength. In this case, the watermark insertion strength is a core factor for adjusting robustness and invisibility of the watermark.

Using formula 1, the watermark is adaptively inserted into an original image. However, since a that is a watermark insertion strength is a fixed constant, there may take place the reverse phenomenon that, comparing an image with many complex areas with an image with many flat areas, actually the watermark insertion strength of the image with many flat areas is comparatively higher.

In other words, comparing a MWMS in the image with many complex areas with that in the image with many flat areas, the MWMS prior to being normalized is smaller in the image with many complex areas than in the image with many flat areas. However, a normalized MWMS is smaller in the image with many flat areas than in the image with many complex areas.

In this case, there takes place the reverse phenomenon that actually the watermark insertion strength in the image with many complex areas becomes smaller than that in the image with many flat areas. Therefore, an image quality of the image with many complex areas is good, but robustness thereof is reduced. On the other hand, the robustness of the image with many flat areas is good, but the image quality thereof is reduced.

Accordingly, it is required to adaptively adjust a that is a watermark insertion strength, according to the overall complexity of each image. For this, according to the present invention, a adaptive a is calculated area by area as shown in the following formula 2:

$$I'_{n,m} = I_{n,m} + \alpha_r \cdot ((1-\text{MWMS}_{n,m})S_0 + \text{MWMS}_{n,m}S_1) \cdot w_{n,m} \quad \text{[Formula 2]}$$

where, $I'_{n,m}$ is watermarked contents, $I_{n,m}$ is original contents, $w_{n,m}$ is a watermark, $\alpha_r$ is a local watermark insertion intensity, and $S_0$, $S_1$ are fixed coefficients.

According to an embodiment of the present invention, an image is divided into partial images with a size of m×m pixels and $\alpha_r$ corresponding to each of the partial images is calculated according to the ratio of flat areas, edge areas, and complex areas in each partial image.

On the other hand, on inserting into a Y component a constructively multi-patterned watermark that is a base watermark, the watermark is inserted by tiling the entire image size with the base watermarks.

The data format converter 250 applies the Y component where the constructively multi-patterned watermark is inserted, into the raw data of the original image, and then converts the raw data with the Y component into an original image.

The data format converter 250 may converts the raw data with the watermarked Y component into the same data format as that of the original image, or into a different type of data format.

Figure 6:
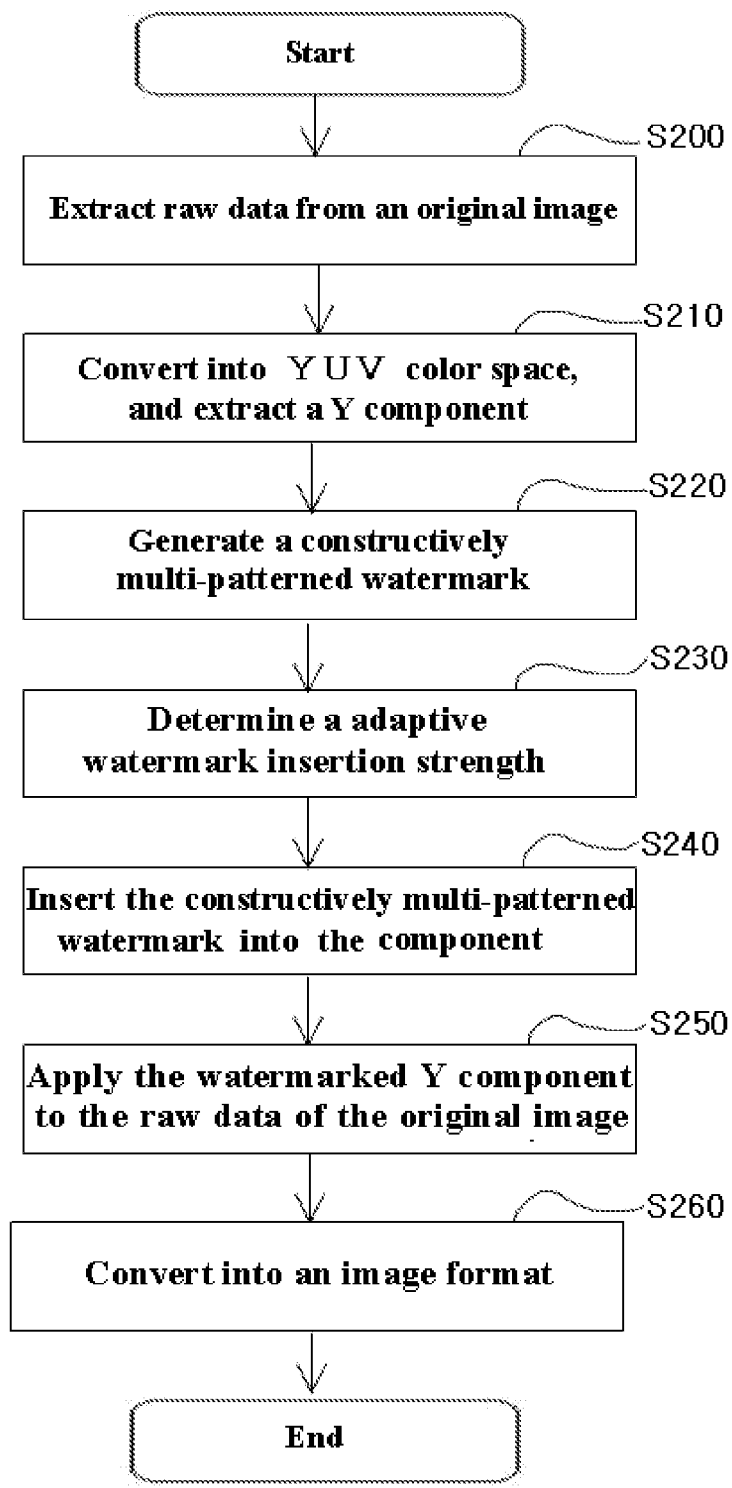
FIG. 6 is a flow diagram illustrating a method for inserting a watermark using the constructively multi-patterned watermark of the present invention.

FIG. 6 is a flow diagram illustrating a method for inserting a watermark using the constructively multi-patterned watermark of an embodiment of the present invention.

As depicted, at block 200 a raw data extractor 210 extracts raw data from an original image that is inputted.

At block 210, a YUV space converter 220 converts color space of the extracted raw data into YUV color space, and extracts a Y component from the YUV color space.

At block 220, a structurally multi-patterned watermark generator 230 generates a plurality of sub-base patterns dividing user's hidden data into a plurality of partial data, and generates, with the plurality of sub-base patterns, a constructively multi-patterned watermark that is a base watermark.

At block 230, a watermark inserter 240 determines a watermark insertion strength for insertion of the constructively multi-patterned watermark into the original image.

At this time, the watermark 240 divides an image into partial images with a size of m×m pixels, and calculates an adaptive watermark insertion strength corresponding to each of the partial images according to the ratio of flat areas, edge areas, and complex areas in each partial image.

At 240, the watermark inserter 240 inserts the constructively multi-patterned watermark into the extracted Y component (Luminance component) using the adaptive watermark insertion strength.

In Other words, the watermark inserter 240 inserts the constructively multi-patterned watermark into the Y component of the original image using formula 2. At this time, the watermark inserter 240 inserts the constructively multi-patterned watermarks, i.e., the base watermark into the Y component by tiling the entire image size with the base watermarks.

At block 250, a data format converter 250 applies the Y component where the constructively multi-patterned watermark is inserted, into the raw data of the original image, and then, at block 260, converts the raw data with the watermarked Y component into an original image format.

Figure 7:
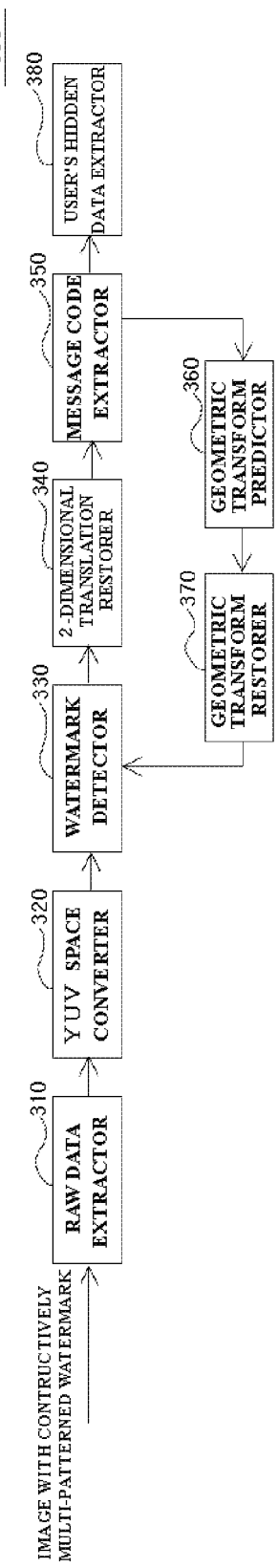
FIG. 7 is a block diagram illustrating an apparatus for detecting a watermark using the constructively multi-patterned watermark of an embodiment of the present invention.

FIG. 7 is a block diagram illustrating an apparatus for detecting a watermark using the constructively multi-patterned watermark of the present invention.

Referring to FIG. 7, the watermark detection apparatus 300 of an embodiment of the present invention includes a raw data extractor 310, a YUV space converter 320, a watermark detector 330, a two-dimensional translation restorer 340, a message code extractor 350, a geometric transform predictor 360, a geometric transform restorer 370, and a user's hidden data extractor 380.

The raw data extractor 310 extracts raw data from an image with the constructively multi-patterned watermark inserted. This is for detecting the watermark from a non-compressed area that is not dependant on a specific format.

The YUV space converter 320 converts color space of the extracted raw data into YUV color space, and extracts a Y component from the YUV color space.

The watermark detector 330 predicts a watermark detection strength for detection of the constructively multi-patterned watermark, from the extracted Y component, and detects the constructively multi-patterned watermark from the Y component applying the watermark detection strength.

The watermark detector 330 uses a Wiener Filter to predict the watermark detection strength. Filter parameters used in the Wiener Filter is adaptively adjusted for each pixel, which makes it possible to precisely predict the watermark detection strength distorted by various image transforms.

In other words, in the present invention the watermark detection strength is predicted using a modified Wiener Filter as shown in the following formula 3:

$$h(n_1, n_2) = \begin{cases} \dfrac{\sigma_f^2 + \dfrac{\sigma_v^2}{(2M+1)^2}}{\sigma_f^2 + \sigma_v^2}, & n_1 = n_2 = 0 \\ \dfrac{\dfrac{\sigma_v^2}{(2M+1)^2}}{\sigma_f^2 + \sigma_v^2}, & -M \le n_1, n_2 \le M, \\ & \text{except } n_1 = n_2 = 0 \\ 0, & \text{otherwise} \end{cases} \quad \text{[Formula 3]}$$

where h(n1, n2) represents a modified Wiener Filter, $\sigma_f^2$ represents a local variance of an original image, $\sigma_v^2$ represents a local variance of a watermark signal, and M represents a size of the filter.

At this time, if a filter such as the following formula 4 is configured by predicting the local variance of the watermark signal using formula 2 for calculation of the watermark insertion strength, and by calculating a local variance corresponding to coordinates (n1, n2) of an original image, the watermark signal inserted by a watermark inserter can be predicted.

The two-dimensional translation restorer 340 performs synchronization with respect to a two-dimensional translation of the image to restore the two-dimensional translation of the image.

The two-dimensional translation restorer 340 uses a folding technique as preprocessing for the synchronization with respect to the two-dimensional translation. The two-dimensional translation restorer 340 superposes the detected watermark on another, and measures a cross correlation between a reference synchronization signal and a synchronization signal predicted by formula 4, thereby restoring the two-dimensional translation of the image.

On inserting the watermark, the entire image is tiled with a plurality of the base waters, i.e., the constructively multi-patterned watermarks. Therefore, if using a folding technique for a watermark, among the watermark signals predicted in the absence of the two-dimensional translation of the image, signals that are not a watermark signal, i.e., error signals become saturated, while the superposition of the predicted watermark signals can maximize signal intensity.

On other words, since error signals that are not a watermark signal has a Gaussian random distribution, the superposition of error signals per location is consequently saturated into an average value of error signals and thereby is removed. On the other hand, since as for the predicted watermark signals, the same signals are superposed on the same location, the signal intensity becomes more and more and more intensified.

The two-dimensional translation restorer 340 measures the cross correlation between a reference synchronization signal and a synchronization signal predicted among watermark signals predicted by the folding technique, and then extracts a message code on a basis of the location where the cross correlation is the highest.

If measuring the cross correlation between the predicted synchronization signal and the reference synchronization signal, an amount of calculation is much increased since the convolution-type calculation should be performed in a spatial domain.

Therefore, according to the present invention, an amount of calculation can be decreased by substituting a multiplication-type calculation in a frequency domain for the convolution-type calculation, using a Fourier Transform.

The message code extractor 350 extracts a message code from the restored watermark signal. In this case, the message code extractor 350 extracts the message code from the restored watermark signal through a similarity measurement, and a M-ary demodulation or a Binary demodulation method using a spread spectrum technique.

The M-ary demodulation method is a ML (Maximum Likelihood) method for selecting a symbol of the signal with the highest similarity to a comparison signal, among M number of test set signals, using a correlation decoder.

In this case, though a correlation value does not indicate a likelihood value directly, the correlation value is substantially proportional to the likelihood value. Accordingly, the signal with the highest correlation value is equal to that with the highest similarity.

If geometric transform is intentionally applied to an image, the message code extractor may not extract the message code. At this time, the degree of the geometric transform is required to be predicted, and the predicted geometric transform is to be restored.

Therefore, the geometric transform predictor 360 predicts the degree of the geometric transform of the image, and the geometric transform restorer 370 restores the predicted geometric transform of the image.

The geometric transform predictor 360 predicts the geometric transform using the fact that auto correlation values in a two-dimensional spatial domain are periodically high at an interval of the size (for example, 2N×2N) of a constructively multi-patterned watermark that is a basic unit on inserting a watermark, and the fact that an original size, location, etc. of the constructively multi-patterned watermark can be analyzed, since the constructively multi-patterned watermark is equally transformed according to the geometric transform.

The geometric transform predictor 360 replaces a convolution-type calculation in a spatial domain by a multiplication-type calculation in a frequency domain, and thereby calculates the auto correlation of watermark signals.

Specifically, the geometric transform predictor 360 measures an auto correlation pattern using periodic characteristics of the watermark signals, and then extracts coordinates whose auto correlation values are high.

Figure 8:
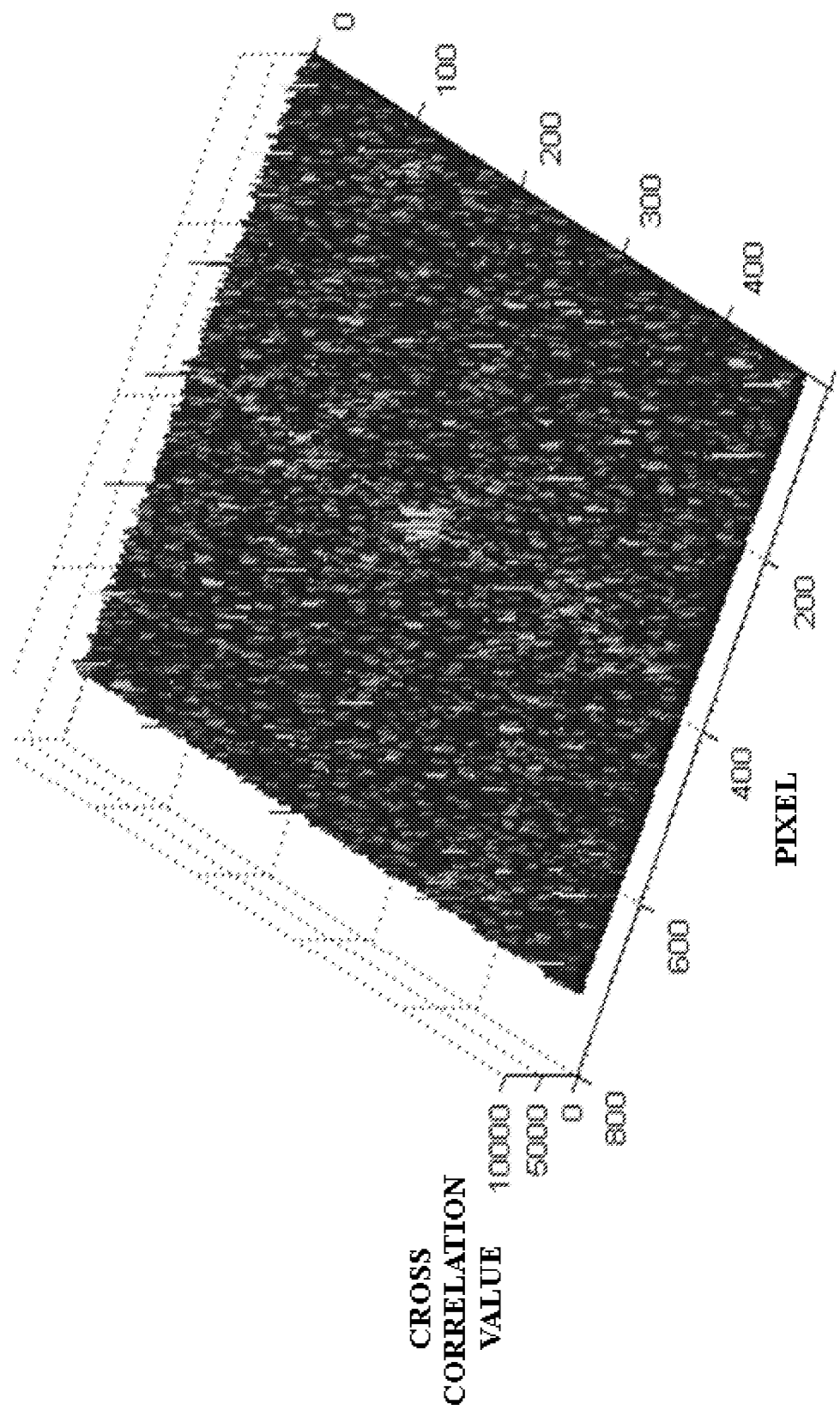
FIG. 8 is a graph illustrating an auto correlation pattern of a watermark.

FIG. 8 is a graph illustrating an auto correlation pattern of a watermark. Referring to FIG. 8, it is understood that auto correlation values are quite high on a regular cycle. The geometric transform predictor 360 detects locations of peak values with a quite high auto correlation values.

The geometric transform restorer 370 performs an inverse transform for the predicted geometric transform, and restores the predicted geometric transform into an original image.

In an example, the geometric transform restorer 370 generates inverse affine parameters for the geometric transform using the detected locations of pixels, and restores an original image using the generated inverse affine parameters.

The following formula 4 represents a general affine transform matrix.

$$\begin{bmatrix} x' \\ y' \end{bmatrix} = \begin{bmatrix} a & b \\ c & d \end{bmatrix} \begin{bmatrix} x \\ y \end{bmatrix} + \begin{bmatrix} e \\ f \end{bmatrix} \quad \text{[Formula 4]}$$

where, (x,y) represents a location of an original image, (x', y') represents a location of a transformed image, a, b, c, d are affine parameters representing a rotational angle, e, f are affine parameters representing a linear translation distance. Since e, f can be obtained by a similarity measurement, they are omitted in here.

Coordinates forming two pairs, i.e., (x1, y1), (x'1, y'1) and (x2, y2), (x'2, y'2) are applied to formula 3, and inverse affine parameters for restoration of an original image are calculated using an inverse matrix. The inverse affine parameters are shown by the following formula. 5.

$$\begin{bmatrix} a & b \\ c & d \end{bmatrix}^{-1} = \begin{bmatrix} x_1 & y_1 \\ x_2 & y_2 \end{bmatrix} \begin{bmatrix} x'_1 & y'_1 \\ x'_2 & y'_2 \end{bmatrix}^{-1} \quad \text{[Formula 5]}$$

The geometric transform restorer 370 restores the original image using the inverse affine parameters obtained by formula 5. The image restored by the geometric transform restorer 370 is inputted to the watermark detector 330, and the watermark detector 330 performs a prediction of watermark detection sensitivity, message code extraction, and user's hidden data detection, etc., recursively.

The geometric transform restorer 370 determines whether the following conditions are fulfilled by a group of 4 coordinates with a first highest peak value to a fourth highest peak value among locations of pixels that are detected by the geometric transform predictor 360. Since a watermark with a size of 2N×2N pixels is periodically inserted, several groups of 4 coordinates are generated as in FIG. 8. If the following conditions are fulfilled, the geometric transform restorer 370 abandons restoring the image assuming that a commercial quality of the image is too greatly reduced by the image transform.

At this time, since auto correlation values in a two-dimensional spatial domain are shown high on a regular cycle of a basic size of the watermark, it may be assumed that 4 coordinates are the coordinates of the vertexes forming a base watermark. For example, if a base watermark has a size of 32×32 pixels, 4 coordinates are (0, 0), (0, 32), (32, 0), (32, 32), respectively.

i) If each straight-line distance between any two of the 4 coordinates is less than ½ of each straight-line distance between any two of the 4 coordinates on an original image;

This case means that an overall scale of the image is decreased into less than ½ of that of the original image. Thus, the geometric transform restorer 370 abandons restoring the image assuming that a commercial quality of the image is too greatly reduced by the image transform.

ii) If each of the internal angles that are formed by connecting three coordinates among the 4 coordinates is outside of the range from 75 to 105 degrees;

Generally, if there is no geometric transform in an image, the internal angles formed by connecting three coordinates among four coordinates are 90 degrees. However, if the internal angles are outside of the range from 75 to 105 degrees, the geometric transform restorer 370 abandons restoring the image assuming that a commercial quality of the image is too greatly reduced by the image transform.

iii) If a ratio of the lengths of two straight lines which are formed by connecting three coordinates among the 4 coordinates is more than 1:2;

Generally, if there is no geometric transform in an image, a ratio of the lengths of two straight lines formed by connecting three coordinates among four coordinates is 1 to 1. However, if a ratio of the lengths of two straight lines is more than 1:2 due to the geometric transform of the image, the geometric transform restorer 370 abandons restoring the image assuming that a commercial quality of the image is too greatly reduced by the image transform.

The user's hidden data extractor 380 extracts user's hidden data from the extracted message code. The user's hidden data extractor 380 extracts the user's hidden data by restoring restorable errors using error correction codes.

In this case, a GMD (Generalized Minimum Distance) decoder is used for the decoding of the error correction codes. This is because a coding gain of about 2~3 dB can be obtained in a AWGN (Additive White Gaussian Noise) channel using soft-decided data rather than hard-decided data for the code decoding.

Furthermore, according to the present invention, since, at the step of inserting a watermark, the constructively multi-patterned watermark is defined as a base watermark, it makes it possible to use a coordinate system unchanged by simple transforms such as a flip, mirror, 90-degree rotation, 180-degree rotation, and 270-degree rotation of an image through the constructive characteristics of the watermark.

Figure 9:
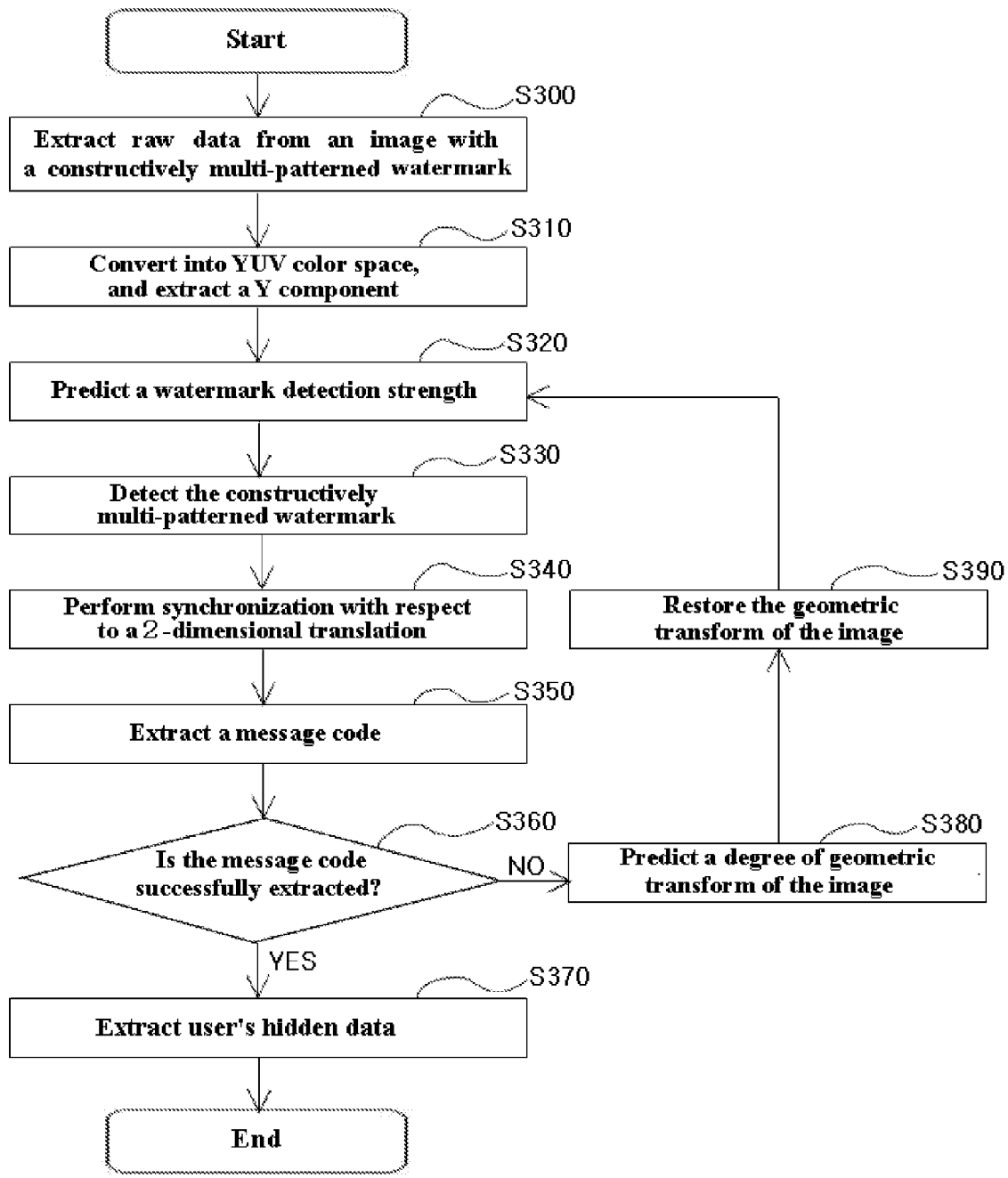
FIG. 9 is a block diagram illustrating a method for detecting a watermark using the constructively multi-patterned watermark of the present invention.

FIG. 9 is a block diagram illustrating a method for detecting a watermark using the constructively multi-patterned watermark of the present invention.

Referring to FIG. 9, at block 300 a raw data extractor 310 extracts raw data from an image with a constructively multi-patterned watermark inserted.

At block 310, a YUV space converter 320 converts color space of the extracted raw data into YUV color space, and extracts a Y component from the YUV color space.

At block 320, a watermark detector 330 predicts a watermark detection strength for detection of the constructively multi-patterned watermark, from the extracted Y component.

At this time, the watermark detector 330 predicts the watermark detection strength using a modified Wiener Filter, and, for preprocessing, may apply a prediction filter such as a Cross-Shaped Filter, Squared Filter, etc. to the image.

At block 330, the watermark detector detects the constructively multi-patterned watermark from the image applying the predicted watermark detection strength.

At block 340, a two-dimensional translation restorer 340 performs synchronization with respect to a two-dimensional translation of the image and restores the two-dimensional translation of the image. In an example, the two-dimensional translation restorer 340 superposes the detected watermark signal on another using a folding technique, measures a cross correlation between a reference synchronization signal and a synchronization signal among watermark signals predicted by the superposition, and performs synchronization based on a signal with the highest cross correlation to restore the two-dimensional translation of the image.

At block 350, a message code extractor 350 extracts a message code from the watermark signal whose two-dimensional translation is restored. The message code extractor 350 extracts the message code from the restored watermark signal through a similarity measurement and a M-ary demodulation or a Binary demodulation using spread spectrum.

At block 360, a user's hidden data extractor 360 confirms whether the message code extractor 350 extracts the message code successfully at block 350. At block 370, if the message code is successfully extracted, the user's hidden data extractor 360 extracts user's hidden data from the extracted message code.

At block 380, if the message is not successfully extracted by the message code extractor 350 at block 350, a geometric transform predictor 360 predicts the degree of geometric transform of the image.

At this time, the geometric transform predictor 360 measures auto correlation pattern using the periodical characteristics of watermark signals, and then extracts coordinates with high auto correlation, thereby predicting the degree of the geometric transform of the image.

A block 390, a geometric transform restorer 370 generates an inverse affine parameter for the geometric transform using coordinate detected by the geometric transform predictor 360, and then restores an original image using the generated inverse affine parameter.

In an example, the geometric transform restorer 370 determines whether the following conditions are fulfilled by 4 coordinates with a first highest peak value to a fourth highest peak value among coordinates of pixels that are detected by the geometric transform predictor 360. If the following conditions are fulfilled, the geometric transform restorer 370 abandons restoring the geometric transform of the image assuming that a commercial quality of the image is too greatly reduced by the image transform.

The following conditions is as follows: (1) each straight-line distance between any two of the 4 coordinates is less than ½ of each straight-line distance between any two of the 4 coordinates on an original image, (2) each of the internal angles that are formed by connecting three coordinates is outside of the range from 75 to 105 degrees, and (3) a ratio of the lengths of two straight lines that are formed by connecting three coordinates is more than 1:2.

The image restored by the geometric transform restorer 370 goes through block 320 to block 370 recursively.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. An apparatus that generates a constructively multi-patterned watermark, comprising:
- a data divider that divides user's hidden data into a plurality of partial data and outputs the plurality of partial data;
- an encoder that performs a message-encoding of the plurality of partial data;
- a modulator that modulates the plurality of message-encoded partial data into image signal format to output a plurality of message signals;
- a synchronization signal generator that generates a synchronization signal for synchronizing the constructively multi-patterned watermark with a two-dimensional translation of an image;
- a sub-base pattern generator that generates a plurality of sub-base patterns using the plurality of message signals modulated into the image signal format, and the synchronization signal; and
- a base watermark generator that generates a base watermark that is the constructively multi-patterned watermark, using the plurality of sub-base patterns.

2. The apparatus of claim 1, wherein the encoder performs the message-encoding of the plurality of partial data using an error correction code.

3. The apparatus of claim 1, wherein the data divider divides the user's hidden data into a N×N-number of partial data (N: natural number) and outputs the N×N number of partial data.

4. The apparatus of claim 3, wherein the data divider divides the user's hidden data into four of the partial data and outputs the four of the partial data.

5. The apparatus of claim 4, wherein the base watermark generator inserts each of 4 sub-base patterns into each corresponding area, in the form of a non-rotated, a 90 degree-rotated, a 180 degree-rotated, and a 270 degree-rotated pattern, respectively so as to generate the base watermark.

6. The apparatus of claim 4, wherein the base watermark generator inserts each of 4 sub-base patterns into each corresponding area, in the form of an original pattern, a vertically symmetrical pattern, a horizontally symmetrical pattern, and a vertically and horizontally symmetrical pattern, respectively so as to generate the base watermark.

7. An apparatus for inserting a constructively multi-patterned watermark, comprising:
- a raw data extractor that extracts raw data from an inputted original image;
- a YUV space converter that converts color space of the extracted raw data into YUV color space and extracts a Y component from the YUV color space;
- a constructively multi-patterned watermark generator that generates a plurality of sub-base patterns by dividing user's hidden data into a plurality of partial data, and generates, with the plurality of sub-base patterns, the constructively multi-patterned watermark that is a base watermark; and
- a watermark inserter that determines a watermark insertion strength for insertion of the constructively multi-patterned watermark into the extracted Y component, and inserts the constructively multi-patterned watermark into the Y component by applying the determined watermark insertion strength to the extracted Y component.

8. The apparatus of claim 7, wherein the constructively multi-patterned watermark generator comprises:
- a data divider that divides the user's hidden data into the plurality of partial data and outputs the plurality of partial data;
- an encoder that performs a message-encoding of the plurality of partial data;
- a modulator that modulates the plurality of message-encoded partial data into image signal format to output a plurality of message signals;
- a synchronization signal generator that generates a synchronization signal for synchronizing the constructively multi-patterned watermark with a two-dimensional translation of an image;
- a sub-base pattern generator that generates a plurality of sub-base patterns using the plurality of message signals modulated into the image signal format and the synchronization signal; and
- a base watermark generator that generates a base watermark that is the constructively multi-patterned watermark, using the plurality of sub-base patterns.

9. The apparatus of claim 8, wherein the data divider divides the user's hidden data into four of the partial data and outputs the four of the partial data.

10. The apparatus of claim 9, wherein the base watermark generator inserts each of 4 sub-base patterns into each corresponding area, in the form of a non-rotated, a 90 degree-rotated, a 180 degree-rotated, and a 270 degree-rotated pattern, respectively so as to generate the base watermark.

11. The apparatus of claim 9, wherein the base watermark generator inserts each of 4 sub-base patterns into each corresponding area in the form of an original pattern, a vertically symmetrical pattern, a horizontally symmetrical pattern, and a vertically and horizontally symmetrical pattern, respectively so as to generate the base watermark.

12. The apparatus of claim 7, wherein the watermark inserter inserts the constructively multi-patterned watermark into the Y component using the following formula:

$$I'_{n,m} = I_{n,m} + \alpha_r \cdot ((1-\text{MWMS}_{n,m})S_0 + \text{MWMS}_{n,m}S_1) \cdot w_{n,m}$$

where, $I'_{n,m}$ is watermarked contents, $I_{n,m}$ is original contents, $w_{n,m}$ is a watermark, $\alpha_r$ is a local watermark insertion strength, and $S_0$, $S_1$ are fixed coefficients.

13. An apparatus for detecting a constructively multi-patterned watermark, comprising:
- a raw data extractor that extracts raw data from an image with the constructively multi-patterned watermark inserted;
- a YUV space converter that converts color space of the extracted raw data into YUV color space, and extracts a Y component from the YUV color space;
- a watermark detector that predicts a watermark detection strength from the extracted Y component, and detects the constructively multi-patterned watermark from the Y component applying the watermark detection strength;
- a two-dimensional translation restorer that performs synchronization with respect to a two-dimensional translation of the image to restore the two-dimensional translation of the image;
- a message code extractor that extracts a message code from a watermark signal where the two-dimensional translation is restored; and
- a user's hidden data extractor that extracts user's hidden data from the extracted message code.

14. The apparatus of claim 13, further comprising:
- a geometric transform predictor that predicts a degree of geometric transform of the image; and
- a geometric transform restorer that restores the geometric transform of the image by using the predicted degree of the geometric transform.

15. The apparatus of claim 14, wherein the geometric transform predictor measures auto correlation pattern of the detected constructively multi-patterned watermark, and extracts coordinates of pixels whose auto correlation values have a periodic pattern, in order to predict the degree of the geometric transform of the image.

16. The apparatus of claim 15, wherein the geometric transform restorer calculates an inverse transform parameter for the geometric transform of the image using the coordinates of pixels whose auto correlation values have a periodic pattern, and restores the geometric transform of the image using the inverse transform parameter.

17. The apparatus of claim 16, wherein the geometric transform restorer selects a group of four coordinates with a first highest peak value to a fourth highest peat value, respectively, among the coordinates whose auto correlation values have a periodic pattern, and then abandons restoring the geometric transform of the image if the 4four coordinates meet any one of the following conditions:
  (1) each straight-line distance between any two of the 4four coordinates is less than ½ of each straight-line distance between any two of the 4four coordinates on an original image;
  (2) each of the internal angles formed by connecting three coordinates is out of the range of 75 to 105 degrees; and
  (3) a ratio of the lengths of two straight lines formed by connecting three coordinates is more than 1:2.

18. The apparatus of claim 7, wherein the watermark inserter performs a modeling for the extracted Y component using a probabilistic modeling to calculate a MWMS (Maximum Watermark Strength) using a ML (Maximum Likelihood) estimation or a MAP (Maximum A Posteriori) estimation for the modeling, divides image of the extracted Y component into partial images with a size of m×m pixels to calculate each local watermark insertion strength of the partial images according to a corresponding ratio of flat areas, edge areas and complex areas of each of the partial images, and inserts the constructively multi-patterned watermark into the Y component using the MWMS and the local watermark insertion strength.

19. The apparatus of claim 8, wherein the data divider divides the user's hidden data into a N×N number of the partial data (N: natural number) and outputs the N×N number of the partial data.

* * * * *